H. C. PEASE.
LUBRICANT RETAINER.
APPLICATION FILED APR. 20, 1910.
1,042,719.
Patented Oct. 29, 1912.
Fig. 1,
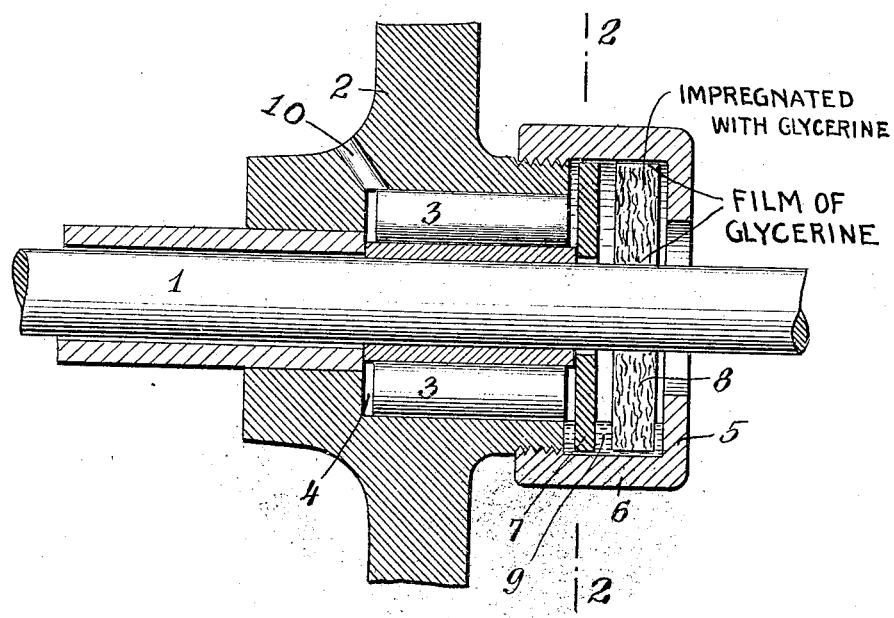
Fig. 2,
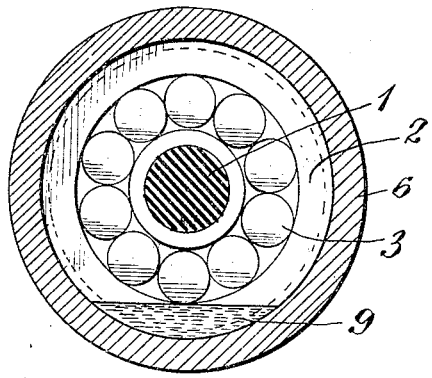
WITNESSES
INVENTOR
Harold C. Pease
BY
ATTORNEY

UNITED STATES PATENT OFFICE.

HAROLD C. PEASE, OF SCHENECTADY, NEW YORK.

LUBRICANT-RETAINER.

1,042,719.  Specification of Letters Patent.  Patented Oct. 29, 1912.

Application filed April 20, 1910. Serial No. 556,621.

*To all whom it may concern:*

Be it known that I, HAROLD C. PEASE, a citizen of the United States, residing at Schenectady, in the county of Schenectady and State of New York, have invented certain new and useful Improvements in Lubricant-Retainers, of which the following is a specification.

This invention is directed to the provision of improved means for retaining a lubricant within a bearing or other device in order to prevent waste of the lubricant, to decrease the possibility of injury to the apparatus due to lack of lubricant and to prevent the lubricant from coming in contact with parts which would be injured thereby.

The invention is susceptible of use in many and widely different relations and is in no way restricted as to its application; thus it may be employed to advantage in connection with bearings for a rotary shaft to prevent the escape of oil therefrom and in packings for various uses. In practice I have found it of particular utility in connection with the bearings for the drive shaft of an automobile where it not only effects a saving of oil and insures proper operation, but also prevents the oil from spreading over parts exterior to the bearing, such as the brakes, which would be injured thereby.

The invention resides in the employment of glycerin in a bearing or packing to prevent a lubricating oil from working out through the space between a moving and a relatively stationary part. Suitable material is employed for holding the glycerin, as for instance a body of a porous or fibrous absorbent substance which may be impregnated with the glycerin. In the preferred embodiment of the invention, an annulus of such a porous or fibrous substance as leather or felt is provided at one or both sides of a bearing, this being impregnated with glycerin and having the rotary shaft which is journaled in the bearing passing through the opening therein. The lubricating oil with which the bearing is filled contacts with one side of this annulus or oil-retaining packing but will not enter and pass through the same because of the presence of the glycerin therein; also, a thin film of the glycerin will fill into the space between the rotary shaft and the felt or leather annulus and prevent the lubricating oil from working along the shaft to the exterior of the bearing.

One embodiment of the invention is illustrated in the accompanying drawing, in which—

Figure 1 is a longitudinal section of a bearing for a rotary shaft provided with my improved lubricant retainer, and Fig. 2 is a transverse section on line 2—2 of Fig. 1.

Referring to the drawing, 1 indicates a rotary shaft and 2 a frame-member formed to provide a bearing for shaft 1. In the member 2 is a suitable cylindrical chamber 4 having a plurality of steel rollers 3 therein on which shaft 1 bears. The space around the rollers 3 and between them and shaft 1 is filled with lubricating oil, through the opening 10 in member 2 shown in Fig. 1 leading to the chamber 4. Member 2 has a boss formed thereon co-axial with shaft 1 and exteriorly threaded so as to receive thereon a cap 6 provided with an inwardly turned flange 5, and between this flange and the end of member 2 a steel washer 7 may be employed. At one or both sides of the bearing is a washer or annulus 8 of a porous or fibrous absorbent substance impregnated with glycerin or glycerin and another fluid combined. Preferably heavy felt is employed for this washer as it can be cut to the desired shape, will retain that shape and will hold therein a substantial quantity of the glycerin. This washer 8 is located between the flange 5 and the steel washer 7 and it is of such size that it fits closely around the shaft 1 and within the cap 6. If desired, more glycerin may be introduced into the bearing than will be taken up by washer 8, as indicated at 9, this being retained therein by flange 5, so that the supply of the glycerin held by washer 8 will be replenished when necessary. By reason of the impregnation of the washer 8 with glycerin, the lubricating oil in the bearing will not be absorbed by the washer and allowed to work its way through the same; and enough of the glycerin comes out upon the surfaces of the washer to form a thin film between the shaft 1 and cap 6 and the adjacent surfaces of the washer, which film prevents the oil from passing along the shaft and cap to the exterior of the bearing. The washer 7 of metal is employed for spacing the washer 8 from the bearing and the rollers 3 as the fibrous washer 8 might become worn if it engaged these parts. The washer 8 is of such size that it makes a tight fit upon the shaft 1 and within the cap 6, so much so that it will hold a film of glycerin between these parts and the washer which film will prevent the lubricant passing by. Preferably, the parts will be so constructed that the shaft will rotate in the opening through the washer but the washer may rotate with the shaft in cap 6 and accomplish the desired result.

It will be understood that the construction of the bearing as herein described may be varied in any way desired or as may be necessary to adapt it for a particular use and also that the invention as herein described may be used in packings and in various devices other than bearings.

Having described my invention what I claim as new therein and desire to secure by Letters Patent of the United States is:

The combination of a rotary shaft, a relatively stationary bearing therefor adapted to have lubricating oil supplied thereto, and an absorbent glycerin-carrying annulus encircling the shaft and extending in close proximity to the bearing, said annulus being impregnated with glycerin to prevent passage of the lubricating oil therethrough and said glycerin forming films between the annulus and the shaft and bearing to prevent escape of the lubricating oil along the surfaces of the shaft and bearing, substantially as set forth.

This specification signed and witnessed this 6th day of April, 1910.

HAROLD C. PEASE.

Witnesses:
BENJAMIN B. HULL,
HELEN ORFORD.